(12) United States Patent
Grayson et al.

(10) Patent No.: US 9,559,866 B2
(45) Date of Patent: Jan. 31, 2017

(54) SYSTEMS AND METHODS FOR LOAD BALANCING IN CELLULAR NETWORKS AND WIRELESS LOCAL AREA NETWORKS

(75) Inventors: Mark Grayson, Maidenhead (GB); Kevin Shatzkamer, Hingham, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 48 days.

(21) Appl. No.: 13/333,381

(22) Filed: Dec. 21, 2011

(65) Prior Publication Data

US 2013/0163463 A1    Jun. 27, 2013

(51) Int. Cl.
*H04L 12/54* (2013.01)
*H04L 12/26* (2006.01)
*H04L 12/24* (2006.01)
*H04W 76/02* (2009.01)

(52) U.S. Cl.
CPC .......... *H04L 12/5692* (2013.01); *H04L 41/12* (2013.01); *H04L 43/0876* (2013.01); *H04W 76/025* (2013.01)

(58) Field of Classification Search
CPC ... H04L 12/5692; H04L 41/12; H04L 43/0876
See application file for complete search history.

(56) References Cited

U.S. PATENT DOCUMENTS

| | | | |
|---|---|---|---|
| 6,917,592 B1 | 7/2005 | Ramankutty et al. | |
| 7,340,744 B2 | 3/2008 | Chandwadkar et al. | |
| 7,362,776 B2 | 4/2008 | Meier et al. | |
| 7,415,523 B2 | 8/2008 | O'Rourke et al. | |
| 7,929,973 B2 | 4/2011 | Zavalkovsky et al. | |
| 8,064,948 B2 | 11/2011 | Meier et al. | |
| 2005/0197156 A1* | 9/2005 | Fourquin et al. | 455/553.1 |
| 2005/0239473 A1 | 10/2005 | Pan et al. | |
| 2006/0187873 A1 | 8/2006 | Friday et al. | |
| 2006/0227705 A1 | 10/2006 | Chandwadkar et al. | |
| 2006/0234719 A1* | 10/2006 | Demirhan | H04W 72/02 455/453 |
| 2007/0116019 A1 | 5/2007 | Cheever et al. | |
| 2007/0116020 A1 | 5/2007 | Cheever et al. | |
| 2007/0253328 A1 | 11/2007 | Harper et al. | |
| 2008/0137541 A1 | 6/2008 | Agarwal et al. | |
| 2008/0316980 A1 | 12/2008 | Ahlen et al. | |
| 2008/0317053 A1 | 12/2008 | Panda et al. | |
| 2009/0163223 A1* | 6/2009 | Casey | 455/453 |

(Continued)

OTHER PUBLICATIONS

3GPP TS 23.271 v10.2.0 (Mar. 2011), "3rd Generation Partnership Project; Technical Specification Group Services and Systems Aspects; Functional Stage 2 Description of Location Services (LCS) (Release 10)", 169 pages.

(Continued)

*Primary Examiner* — Walter Divito
(74) *Attorney, Agent, or Firm* — Patent Capital Group

(57) ABSTRACT

Network operators are striving to find ways to provide stable video services amid a rapid increase in video data traffic. In order to provide stable video services with constrained network resources, network operators attempted to deploy multiple communication networks in parallel. However, network operators failed to effectively balance data traffic across parallel communication networks. This disclosure provides systems and methods for effectively balancing data traffic across parallel communication networks.

22 Claims, 10 Drawing Sheets

(56) References Cited

U.S. PATENT DOCUMENTS

| | | | |
|---|---|---|---|
| 2010/0124933 A1 | 5/2010 | Chowdhury et al. | |
| 2010/0238868 A1* | 9/2010 | Melpignano et al. | 370/329 |
| 2010/0296499 A1* | 11/2010 | Karaoguz et al. | 370/338 |
| 2011/0058479 A1 | 3/2011 | Chowdhury | |
| 2011/0075557 A1 | 3/2011 | Chowdhury et al. | |
| 2011/0075675 A1 | 3/2011 | Koodli et al. | |
| 2011/0090839 A1* | 4/2011 | Hamalainen | H04B 7/2606 370/315 |
| 2011/0268007 A1 | 11/2011 | Barany et al. | |
| 2012/0087298 A1 | 4/2012 | Garavaglia et al. | |
| 2012/0163179 A1* | 6/2012 | Jo et al. | 370/237 |
| 2012/0166618 A1 | 6/2012 | Dahod et al. | |
| 2012/0170548 A1 | 7/2012 | Rajagopalan et al. | |
| 2012/0188949 A1* | 7/2012 | Salkintzis et al. | 370/329 |
| 2012/0230191 A1* | 9/2012 | Fang | 370/235 |
| 2013/0100821 A1* | 4/2013 | Joshi | 370/241 |
| 2013/0163424 A1 | 6/2013 | Goerke et al. | |
| 2013/0163434 A1 | 6/2013 | Hamel et al. | |

OTHER PUBLICATIONS

3GPP TS 24.302 v11.0.0 (Sep. 2011), "3rd Generation Partnership Project; Technical Specification Group Core Network and Terminals; Access to the 3GPP Evolved Packet Core (EPC) via Non-3GPP Access Networks; Stage 3 (Release 11)", 58 pages.

3GPP TS 24.312 v11.0.0 (Sep. 2011), "3rd Generation Partnership Project; Technical Specification Group Core Network and Terminals; Access Network Discovery and Selection Function (ANDSF) Management Object (MO) (Release 11)", 157 pages.

3GPP TS 36.413 v10.3.0 (Sep. 2011), "3rd Generation Partnership Project; Technical Specification Group Radio Access Network; Evolved Universal Terrestrial Radio Access Network (E-UTRAN); S1 Application Protocol (S1AP) (Release 10)", 255 pages.

3GPP TS 36.423 v10.3.0 (Sep. 2011), "3rd Generation Partnership Project; Technical Specification Group Radio Access Network; Evolved Universal Terrestrial Radio Access Network (E-UTRAN); X2 Application Protocol (X2AP) (Release 10)", 132 pages.

3GPP TS 23.402 v11.0.0 (Sep. 2011), "3rd Generation Partnership Project; Technical Specification Group Services and System Aspects; Architecture Enhancements for Non-3GPP Accesses (Release 11)", 232 pages.

3GPP TS 36.305 v10.3.0 (Sep. 2011), "3rd Generation Partnership Project; Technical Specification Group Radio Access Network; Evolved Universal Terrestrial Radio Access Network (E-UTRAN); Stage 2 Functional Specification of User Equipment (UE) Positioning in E-UTRAN (Release 10)", 51 pages.

Calhoun, et al., "CAPWAP Protocol Specification: draft-ietf-capwap-protocol-specification-15", Network Working Group, Internet-Draft, Oct. 31, 2008, 166 pages.

Cisco, "Cisco Location Service Solution: Enabling Mobility in Wired and Wireless Networks with Modular Cisco Catalyst Platforms", Jul. 2011, 5 pages.

Cisco, "Lightweight AP (LAP) Registration to a Wireless LAN Controller (WLC)", Document ID: 70333, Updated Sep. 12, 2088, 13 pages.

Simsek, et al., "Analysis of the QBSS Load Element Parameters of 802.11e for a Priori Estimation of Service Quality", 21st UK Performance Engineering Workshop (UKPEW05), Jul. 2005, 17 pages.

\* cited by examiner

SYSTEMS AND METHODS FOR LOAD BALANCING IN CELLULAR NETWORKS AND WIRELESS LOCAL AREA NETWORKS

RELATED APPLICATIONS

The present application is related to U.S. patent application Ser. No. 13/332,804, filed Dec. 21, 2011, by Goerke et al., entitled "SYSTEM AND METHOD FOR LOAD BASED OPTIMIZATION IN COMMUNICATION NETWORKS", which is hereby incorporated by reference herein in its entirety.

FIELD OF THE DISCLOSURE

This disclosure relates generally to systems and methods for load balancing in heterogeneous radio system deployments, for example between cellular networks and wireless local area networks (WLANs).

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many user equipment, including, for example, satellite communications systems, portable digital assistants (PDAs), laptop computers, and mobile devices (e.g., cellular telephones). Such devices can connect to a network (e.g., the Internet) as long as the user is within range of such a wireless communication technology.

The increase in data traffic is straining wireless network operators' existing packet core elements. The increase in data traffic can overload network devices in wireless networks, and it may even cause wireless network service disruptions. The demand for data over wireless networks is not expected to slow, especially as mobile devices become more sophisticated and as users become more dependent on mobile devices.

DESCRIPTION OF EXAMPLE EMBODIMENTS

Overview

Figure 1:
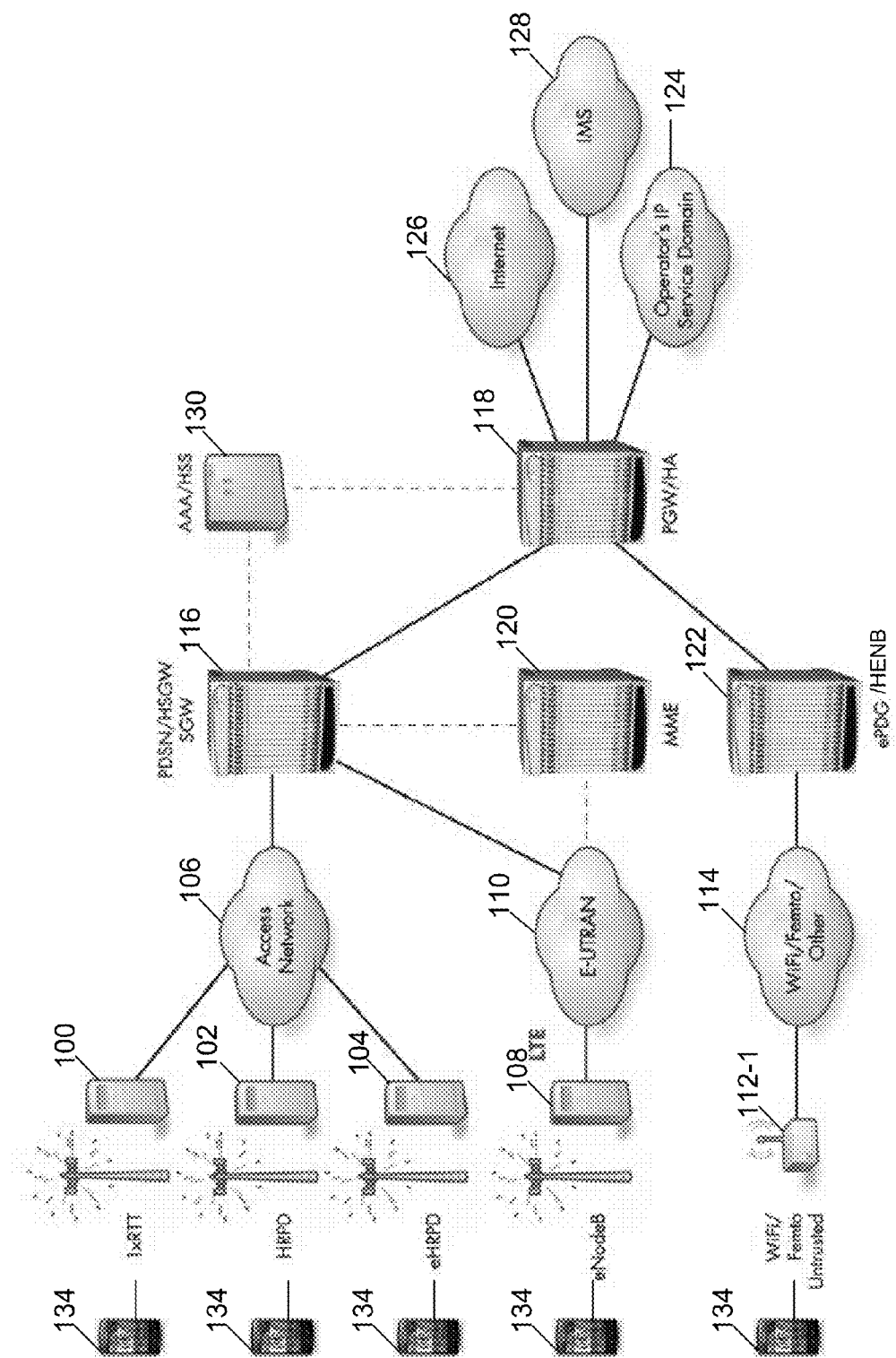
FIGS. 1-2 illustrate a communication network including a long term evolution (LTE) topology in accordance with certain embodiments.

Certain embodiments disclose a method that includes receiving a wireless network condition message that includes data load information associated with a base station in the wireless network, for example a cellular network. The method can also include receiving a wireless local area network (WLAN) condition message that includes data load information associated with an access point in a WLAN. The method further includes identifying a physical location of the base station and the access point and identifying which of the base station and the access point is capable of providing network service to a user equipment. The method can include triggering data load information associated with the identified base station and the identified access point to be sent to the user equipment.

Example Embodiments

Network operators can address the rapid increase in data traffic by correspondingly increasing the network capacity. One way to increase the network capacity is by deploying parallel communication networks using dissimilar radio technology. For example, a network operator can deploy both a cellular communication network and a wireless local area network (WLAN) in a single region so that a portion of the data traffic is serviced through a cellular communication network and the rest of the data traffic is serviced through a WLAN. In some cases, a network operator can leverage a WLAN that is operated by a third-party. If a WLAN is already deployed in a certain area, the network operator can offload data traffic from the cellular network to the WLAN. In another example, a network operator can deploy two parallel cellular networks but using two different technologies. For instance, the network operator can deploy a Long Term Evolution (LTE)-based cellular network that provides islands of hot spot coverage within a wide area Code Division Multiple Access (CDMA) 2000-based cellular network.

One issue with a parallel communication system is efficiency. A communication network is often designed to be a stand-alone system. Therefore, parallel, independent communication networks do not balance data load across the networks. Such an independent operation of communication networks can be particularly inefficient when one of the networks is heavily utilized while other networks are underutilized.

For example, suppose that a cellular network and a WLAN are deployed in a certain region. When a mobile device enters this region with parallel communication networks, the mobile device can detect two parallel communication networks and decide to attach to one of the two parallel networks. Because a WLAN is often faster than a cellular network, a mobile device can decide to attach to the WLAN instead of the cellular network.

Such a network selection strategy, based on prior knowledge about communication networks, can be sufficiently efficient if this mobile device was the only mobile device operating in the region. However, if there are hundreds of other mobile devices operating in that region, this network selection strategy may not be sufficiently efficient. In fact, such a strategy could potentially over-utilize the WLAN and under-utilize the cellular network to the extent that the WLAN speed falls below the cellular network speed.

Mobile devices could use the data load information of parallel communication networks to determine which one of the two networks to attach to. For example, a mobile device can be configured to attach to one of the least utilized networks. However, receiving data load information from each of the parallel communication networks can disrupt mobile devices' on-going data communication. Oftentimes, a mobile device is not equipped to access parallel communication networks simultaneously due to hardware constraints. Therefore, to receive data load information from each of the parallel communication networks, a mobile device has to (1) detach from the current network, (2) attach to the network of interest, (3) receive data load information from the attached network, and (4) iterate steps 1-3 until the mobile device receives data load information from all the parallel networks. Because the mobile device would detach itself from the current network, the mobile device has to halt any on-going data communication until it receives data load information from all the parallel networks. This can be detrimental to the data communication efficiency, especially when the mobile device supports a plurality of communication network technologies and is configured to receive the data load information frequently.

The disclosed systems and methods illustrate a mechanism for balancing data load across parallel communication networks. In particular, the disclosed systems and methods are directed to providing mobile devices with parallel networks' data load information so that mobile devices can determine which one of the parallel networks to attach to. Certain embodiments of the disclosed systems and methods illustrate how to efficiently provide data load information to mobile devices.

FIG. 1 illustrates a communication system with parallel networks in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as Wireless Local Area Network (i.e., Wi-Fi), Femto, WiMAX, or any other radio spectrum technology, can use a transceiver shown generally at 112-1 to connect a user equipment (UE) 134 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WLAN/Femto/other transceiver 112-1. On the packet core side, the anchor gateway can communicate with the operator's IP service domain 124, the Internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE 134 is detached from the network, the HSS 130 maintains the binding information until the UE 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1× and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG/HeNB 122 is responsible for interworking between the EPC and fixed untrusted non-3GPP access technologies such as a WLAN, WiMAX, LTE metro, and femtocell access networks. The ePDG/HeNB 122 can use IPSec/IKEv2 to provide secure access to the EPC network. Optionally, the ePDG/HeNB 122 can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
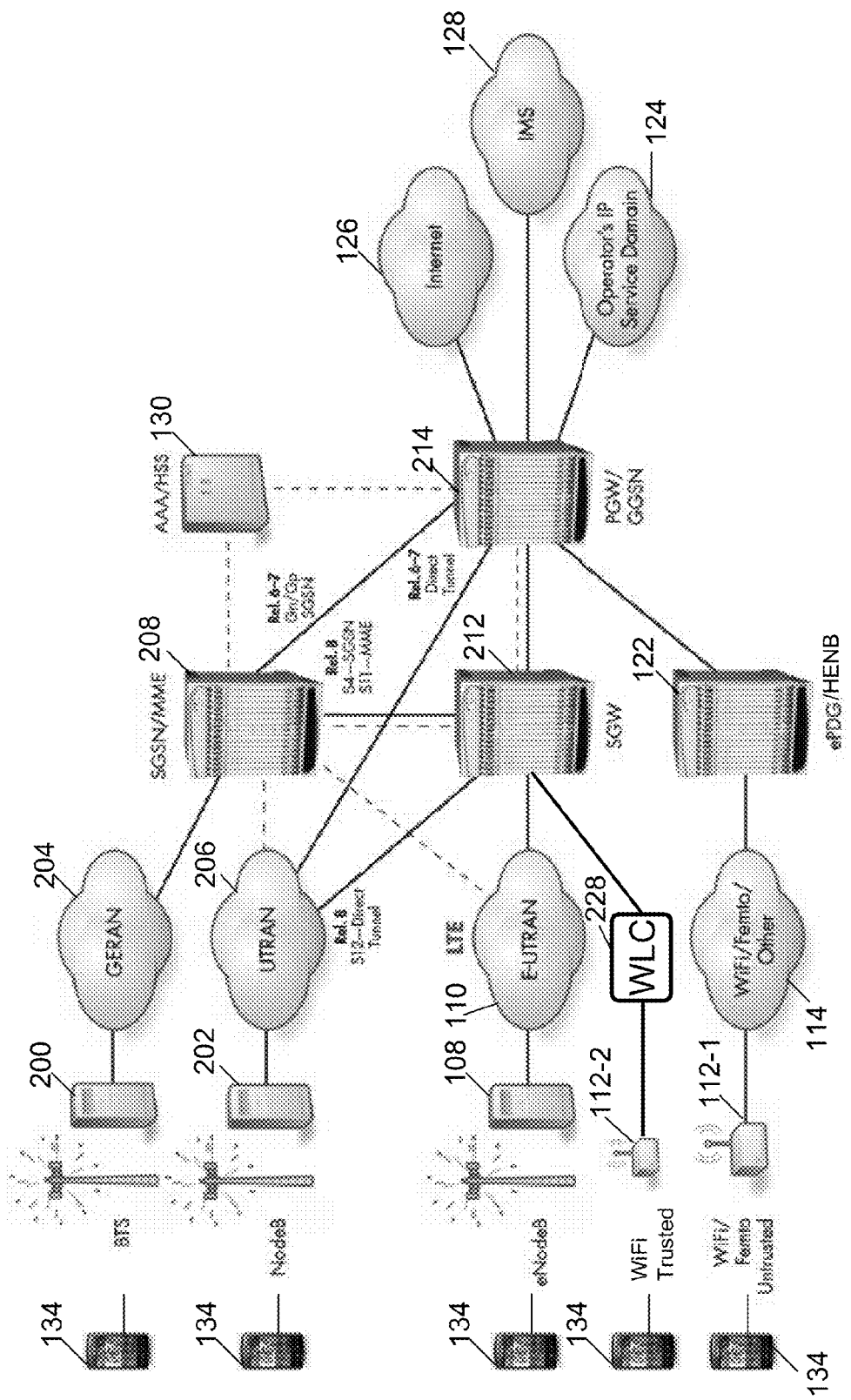

FIG. 2 illustrates a communication system with parallel networks in accordance with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214. UEs 134 can receive data service via a trusted WLAN network. The trusted WLAN can include an access point (AP) 112-2 and a WLAN controller 228. The WLAN controller 228 can connect to an ePDG 122 to gain access to the network. The WLAN controller 228 can also include a Proxy Mobile Internet Protocol (PMIP) v6 Media Access Gateway (MAG) function to directly interface with a SGW 116.

In some embodiments, the efficient mechanism for balancing data load across parallel communication networks can be implemented on gateways, such as PGW/HA 118, PDSN/HSGW/SGW 116, SGSN/MME 208, PGW/GGSN 214, or SGW 212. The gateways can access and maintain information relating to the communication session, the subscriber, the radio bearers, and the policies relating to the communication session. The gateways may be used to provide various services to a UE 134 and implement the quality of service (QoS) on packet flows. Several of these functions are used in providing, for example, voice over IP (VoIP) routing and enhanced services, such as enhanced charging, stateful firewalls, and traffic performance optimization (TPO). The communication networks also allow provision of applications such as VoIP, streaming video, streaming music, multi-user gaming, location based services, and a variety of delivered to a mobile node. Residing within the gateways can be one or more network processing units, line cards, as well as packet and voice processing cards.

Figure 3:
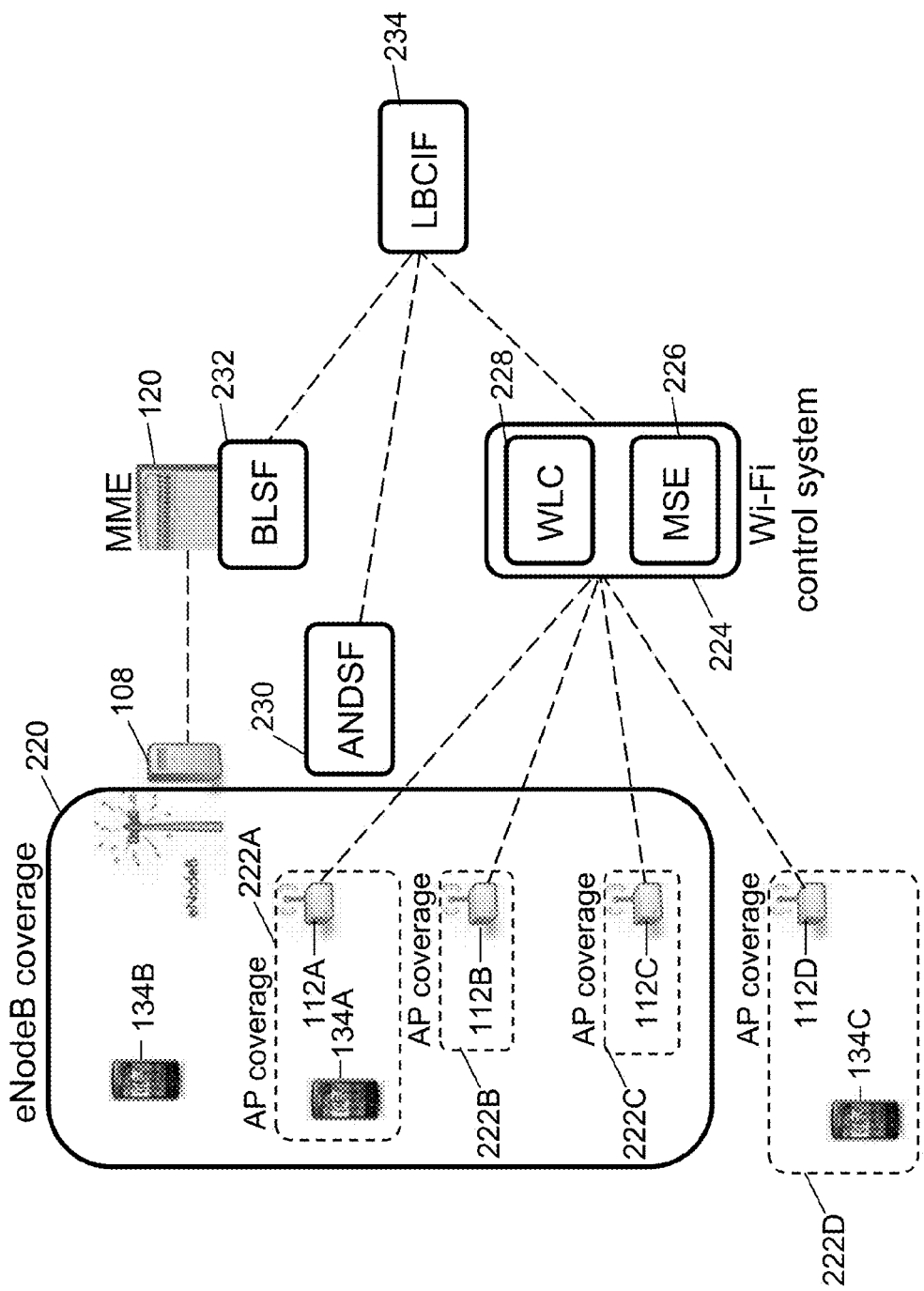
FIG. 3 shows a communication system with parallel networks in accordance with certain embodiments.

FIG. 3 shows a communication system with parallel networks in accordance with certain embodiments. FIG. 3 has a plurality of UEs 134A-134C; a cellular network that includes a base station 108, for example, an evolved Node B (eNodeB) transceiver, a service area 220 of the base station 108, an enhanced MME 120, and a base station load function (BSLF) 232; a wireless local area network (WLAN) that includes a plurality of access points (APs) 112A-112D, service areas 222A-222D of the plurality of APs 112A-112D, a WLAN control system 224 that includes a WLAN controller 228 and a mobility services engine (MSE) 226; a central node called a location based congestion identification function (LBCIF) 234, which is configured to communicate with both the cellular network system and the WLAN system; and an access network discovery and selection function (ANDSF) 230 in an Evolved Packet Core (EPC).

The BSLF 232 can be a part of cellular network's mobility unit, for example, an MME 120. A cellular network is a radio network with multiple transceivers, where each transceiver provides communication to a localized service area called a cell. The cellular network can include LTE networks, HSPA+ networks, and UMTS networks, for example. The size of a cell can vary depending on the transceiver. A macro cell transceiver is typically used by service providers to provide coverage over about a five kilometer distance.

The ANDSF 230 is typically deployed as a stand-alone network device that is accessible by UE 134. The ANDSF 230 can be co-located with the LBCIF 234. In the case of a trusted WLAN, the WLC 228 is located in the WLAN access network. If the trusted WLAN is operated by the cellular network operator, the WLC 228 can also be located in an MME 120. The WLC 228 and the LBCIF 234 can communicate using a Simple Object Access Protocol (SOAP) or a Representational State Transfer (REST) protocol. Likewise, the BSLF 232 and the LBCIF 234 can communicate using the SOAP or the REST protocol, and the LBCIF 234 and the ANDSF 230 can communicate using the SOAP or the REST protocol.

The WLAN controller 228 can include a wireless LAN controller (WLC) 228. A WLC 228 can perform traditional roles of access points, such as association or authentication of wireless clients. APs 112A-112C, also called access points, can register themselves with the WLC 228 and tunnel management and data packets to the WLC 228, which then switches the packets between the user equipment and the wired portion of the network. WLC 228 can be in charge of the configuring the WLAN. WLC 228 can provide configuration information to the APs 112A-112C so that the APs 112A-112C can act as a wireless interface to the UEs 134.

The APs 112A-112C can be equipped with antennas that are configured to transmit and receive data. For example, the APs 112A-112C may transmit video or audio traffic and receive acknowledgements. In one embodiment, the APs 112A-112C can communicate in accordance with IEEE 802.11 standard, including for example, IEEE 802.11n and 802.11k. The APs 112A-112C may transfer video or other forms of high data rate traffic such as audio, or any other type of data traffic.

An ANDSF 230 is configured to assist UEs to discover non-3GPP networks such as WLAN or WiMax. To this end, the ANDSF 230 can be configured to provide, to a UE, policy information regarding routing, mobility and discovery. The policy information can include an inter-system mobility policy, which indicates network selection rules in case only one network is available, (e.g., cellular or WLAN), an inter-system routing policy, which indicates network selection rules in case more than one network is available (e.g., both cellular and WLAN), and discovery information that lists the networks that may be available to the UE and any candidate information about the networks. UEs can register with the ANDSF 230 to receive service from the ANDSF 230.

In certain embodiments, an AP 112 can broadcast its data load condition to UEs 134 (or all the UEs in the AP's service area) using a Quality of Service Basic Service Set (QBSS) load element. The QBSS load element is a part of beacon frames generated by APs and contains the data load information associated with the APs. The QBSS load element can include three parameters: station count, channel utilization, and available admission capacity. The station count can indicate the total number of UEs currently associated with an access point. The channel utilization rate can indicate the normalized value of the total channel utilization which gives the percentage of the time the channel is sensed to be busy using either the physical or virtual carrier sense mechanism of the access point. The available admission capacity can indicate the amount of time that can be used by explicit admission control. A user equipment can use the QBSS load element parameters to decide to which of the available access points to attach.

The communication system in FIG. 3 has a cellular network and a WLAN operating in parallel. Each network can have a plurality of service areas. A service area is often served by a wireless interface, such as a base station 108 or an AP 112. For example, a cellular network can include multiple service areas, each service area served by a base station 108; a WLAN can include multiple service areas, each service area served by an AP 112. In certain embodiments, service areas in different networks can overlap. For example, in FIG. 3, the base station's service area 220 overlaps with the APs' service areas 222A-222C. If a UE 134A is in an area covered by both WLAN and a cellular network, then the UE 134A can attach to one of the overlapping networks for network services.

In certain embodiments, the cellular network and the WLAN are configured to collect their own network condition information. The network condition information can include information on the network configuration and the network usage. For example, the network condition information can include the data load information, which indicates the amount of data being handled by one or more of service areas in a network and/or the amount of additional data traffic that could be handled by one or more of service areas in a network. The network condition information can also include the geo-location of wireless interfaces in a network and a list of UEs currently served by one or more service areas in a network and, if available, the geographic position of the UEs. In certain embodiments, the network condition information associated with a cellular network can be collected by a BSLF 232 in a MME 120. In certain embodiments, the network condition information associated with a WLAN can be collected by the WLC 228 in the WLAN control system 224.

The cellular network and the WLAN can share the collected network condition information with a central node 234. The central node 234, in turn, can retrieve the data load information from the received network condition information, and deliver the retrieved data load information to UEs 134. There can be at least two ways to deliver the data load information to UEs 134: (1) via a WLC 228 using an enhanced 802.11k signalling or (2) via an ANDSF 230 using an IP signalling. For example, in the first option, the central node 234 can deliver the data load information to the WLC 228. In turn, the WLC 228 can deliver the data load information to the AP 112. The AP 112 can subsequently broadcast the data load information to the UEs in the AP's service area. In certain embodiments, the AP 112 can broadcast the information as an enhanced-Quality of Service Basic Service Set (e-QBSS) load element. In the second option, the central node 234 can deliver the relevant data load information to the ANDSF 230, and the ANDSF 230 can relay the data load information to the UE 134. These options allow the UE 134 to receive the network data load information of both the cellular network and the WLAN without disconnecting from the currently attached network.

In certain embodiments, the central node 234 can deliver only relevant portion of the data load information to UEs 134. For a UE 134, the relevant data load information can include the data load information of wireless interfaces that are capable of serving the UE 134. To determine which wireless interfaces can serve the UE 134, also called candidate wireless interfaces, the central node 234 can analyze the location of wireless interfaces. For example, if a UE 134A is attached to an AP 112A, the central node 234 can identify the serving AP 112A as one of the candidate wireless interfaces. To find additional wireless interfaces that can also serve the UE 134, the central node 234 can use the location information of the serving AP 112A and the location information of other wireless interfaces. For example, if a particular wireless interface is physically proximate to the serving AP 112A so that the service are of a particular wireless interface includes that of the serving AP 112A, the central node 234 can identify the particular wireless interface as one of the candidate wireless interfaces. In some embodiments, if the service coverage of the particular wireless interface overlaps with that of the serving wireless interface, the central node 234 can identify that the particular wireless interface as one of the candidate wireless interfaces.

The UE 134 can use the received data load information to determine to which wireless interface to attach. In other words, the UE 134 can use the data load information to determine whether to remain attached to the current wireless interface or to disconnect from the current wireless interface and attach to a wireless interface with less congestion and/or with more available resources. In certain embodiments, the UE 134 can also analyze additional information to decide to which wireless interface to connect. For example, the UE 134 can use one or more of the following: the load condition associated with the wireless interfaces, the wireless signal strengths associated with the wireless interfaces, and a configuration status on the UE 134 indicating whether the UE 134 favors the cellular network or the WLAN.

In certain embodiments, the central node 234 can periodically deliver the data load information to UEs. This way, UEs can attach to a network in a better network condition in substantially real-time. In other embodiments, the central node 234 can deliver the data load information in response to certain triggering events. For example, a central node 234 can analyze the received network condition information to determine if any of the service areas in the parallel networks are congested or heavily utilized. If one of the service areas is congested or heavily utilized, the central node 234 can identify the UEs currently served by the congested service area and the wireless interfaces that can also serve the congested service area. Subsequently, the central node 234 can send, to the identified UEs 134, the data load information associated with the identified wireless interfaces. This way, the identified UEs can disconnect from the congested service area, determine which of the wireless interfaces to connect to, and attach to the determined wireless interface.

Figure 4:
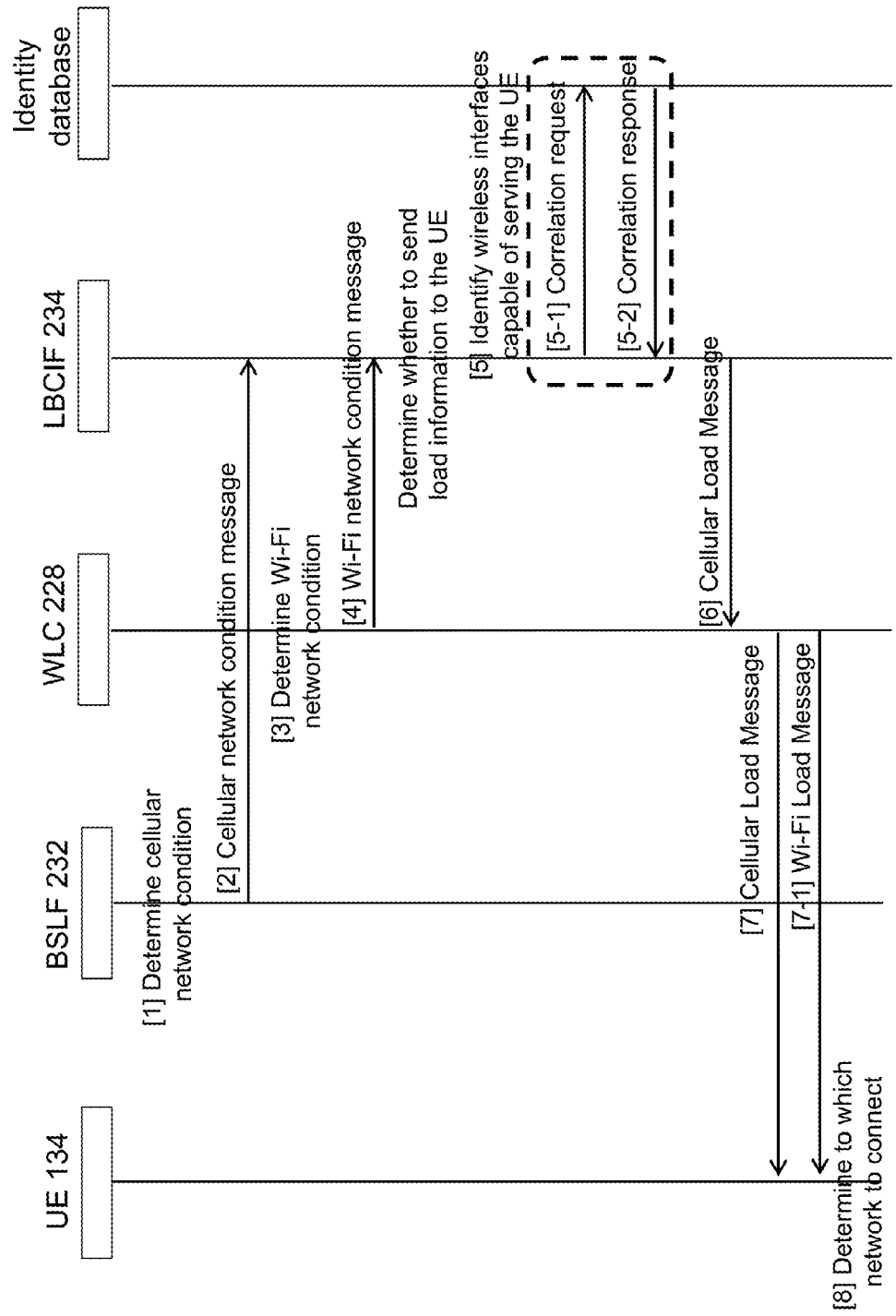
FIG. 4 shows a flow diagram for sending data load information of wireless interfaces via a wireless local area network controller (WLC) in accordance with certain embodiments.

FIG. 4 illustrates an interworking of the cellular network and the WLAN in accordance with certain embodiments. FIG. 4 illustrates a scenario in which the central node 234 delivers the data load information over a WLAN. In step 1, the BSLF 232 identifies the network condition information associated with the cellular network. As discussed above, the network condition information can include information on the network configuration and the network usage (i.e., the data load information). The base station can identify the network condition information using one or more of the following embodiments.

In certain embodiments, the BSLF 232 can receive data load information from a base station 108. A base station 108 can be configured to measure its data load and share the measured data load information with other network devices over X2 connections. Thus, the BSLF 232 (or the MME 120 in which the BSLF 232 resides) can establish a plurality of X2 connections with base station 108 and receive the data load information from one or more base stations 108. The data load information can be formatted in accordance with 3rd Generation Partnership Project (3GPP) Technical Specification 36.423 v. 10.3.0, entitled "Evolved Universal Terrestrial Radio Access Network (E-UTRAN); X2 Application Protocol (X2AP)," which is herein incorporated by reference. In other embodiments, the BSLF 232 can determine the data load condition using systems and methods disclosed in U.S. patent application Ser. No. 13/332,804, filed Dec. 21, 2011, by Goerke et al., entitled "SYSTEM AND METHOD FOR LOAD BASED OPTIMIZATION IN WIRELESS NETWORKS", which is hereby incorporated by reference herein in its entirety.

In certain embodiments, the BSLF 232 can identify the physical location of a base station 108. To identify the physical location of a base station 108, the BSLF 232 (or the MME 120 hosting the BSLF 232) can send a location request to the base station 108. The location request can be sent over an S1 interface using an S1 application protocol. Upon receiving the location request, the base station 108 can obtain its positioning information. In certain embodiments, the base station 108 can use a global positioning system (GPS) to obtain its positioning information. Subsequently, the base station 108 can send a location reply to the BSLF 232. The location reply can include the physical location identifier of the base station 108, which can be represented in terms of GPS coordinates or geographic latitudes and longitudes. The location reply can be sent over an S1 interface using an S1 application protocol. In other embodiments, the BSLF 232 can identify the physical location of the base stations 108 using a standardized positioning architecture specified in 3GPP Technical Specification 23.271, V. 10.2.0, entitled "3rd Generation Partnership Project; Technical Specification Group Services and System Aspects; Functional stage 2 description of Location Services (LCS) (Release 10)," which is hereby incorporated by reference in its entirety.

In certain embodiments, the BSLF 232 can also identify the physical, geographic location of UEs 134. For example, the BSLF 232 (or the MME 120 hosting the BSLF 232) can send a UE positioning request to a base station 108. The base station 108 can identify the UEs 134 attached to the base station 108 and determine the location of the attached UEs 134 using techniques specified in 3GPP Technical Specification 36.305, V. 10.3.0, entitled "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10)," which is hereby incorporated by reference in its entirety. Then the base station 108 sends a UE positioning response to the BSLF 232, including physical location identifiers of UEs 134 served by the base station 108.

In step 2, the BSLF 232 can send a cellular network condition message to the central node 234. The cellular network condition message can include the gathered cellular network condition information.

In step 3, the WLC 228 can determine the network condition associated with the WLAN. The WLC 228 can determine one or more of the components in the network condition using one or more of the following embodiments. In certain embodiments, the WLC 228 can receive data load information from an AP 112. For example, an AP 112 can be configured to measure its data load and send the measured data load information to the WLC 228. The WLC 228 can receive the measured data load information using Internet Engineering Task Force (IETF) Control and Provisioning of Wireless Access Points (CAPWAP) protocol. CAPWAP is a standard, interoperable protocol that enables the WLC 228 to manage a collection of wireless access points.

In certain embodiments, the WLC 228 can identify the physical location of one or more APs 112. To identify the physical location of an AP 112, the WLC 228 can send a location request to the AP 112. Upon receiving the location request, the AP 112 can obtain its positioning information. In certain embodiments, the AP 112 can obtain its positioning information using a global positioning system (GPS). Subsequently, the AP 112 can send a location reply to the WLC 228. The location reply can include the physical location identifier of the AP 112, which can be represented in terms of GPS coordinates or geographic latitudes and longitudes. In some embodiments, the WLC 228 may be in communication with a Mobility Service Engine (MSE) 226 for querying the location of an AP 112. For example, the WLC 228 can send a Simple Object Access Protocol (SOAP) request to MSE 226. The SOAP request can include the identity of the AP 112. Upon receiving the SOAP request, the MSE 226 can provide the geolocation of the AP to the WLC 228 by returning a SOAP response. In other embodiments, the WLC 228 may have been pre-provisioned with the AP geo-location information and be able to retrieve the geolocation of the AP by mapping the identity of the AP 112 to the stored location information.

In step 4, the WLC 228 can send a WLAN condition message to the central node 234. The WLAN condition message can include the gathered WLAN condition information. In certain embodiments, steps 1-2 and steps 3-4 are performed out-of-order or in parallel. In certain embodiments, steps 1-2 or steps 3-4 or both are performed in response to an external trigger signal.

When the central node 234 receives the cellular network condition message and the WLAN condition message, the central node 234 can decide whether to send the received data load information to one or more UEs 134 or not. In certain embodiments, the central node 234 can be configured to send the received data load information to UEs 134 periodically. To this end, the central node 234 can monitor a timer and determine whether a predetermine amount of time has passed since the central node 234 sent the data load information to the UEs 134.

In other embodiments, the central node 234 can be configured to send the received data load information in response to certain triggering events. For example, a central node 234 can analyze the received network condition information to determine if any of the service areas in the parallel networks are congested or heavily utilized. If one of the service areas is congested or heavily utilized, the central node 234 can identify the UEs currently served by the congested service area and the wireless interfaces that can also serve the congested service area. Subsequently, the central node 234 can send, to the identified UEs 134, the data load information associated with the identified wireless interfaces. This way, the identified UEs can disconnect from the congested service area, determine which of the available wireless interfaces to connect to, and attach to the determined wireless interface.

Suppose that the central node 234 has decided to send data load information to a UE 134. In step 5, the central node 234 can determine which data load information would be relevant for the UE 134. For a UE 134, the relevant data load information can include the data load information of candidate wireless interfaces that can serve the UE 134. Therefore, the central node 234 can be configured to identify candidate wireless interfaces associated with the UE 134. In some embodiments, the UE 134 can indicate which wireless interfaces can serve the UE 134. This indication can be provided to the MME 120 as a classmark or configuration information. In one embodiment, the MME 120 can provide the classmark or configuration information to the central node 234. In another embodiment, the MME 120 can determine the candidate wireless interfaces and send a list of candidate wireless interfaces to the central node 234.

In certain embodiments, identifying candidate wireless interfaces can depend on whether the UE 134 is attached to the WLAN or the UE 134 is attached to the cellular network. If the UE 134 is attached to the WLAN, the central node 234 can identify the serving AP 112 as one of the candidate APs for the UE 134. Also, if the UE 134 is attached to the cellular network, the central node 234 can identify the serving base station 108 as one of the candidate base stations for the UE 134.

In certain embodiments, the central node 234 can identify additional candidate wireless interfaces based on wireless interfaces' relationship to the serving wireless interface. In particular, the central node 234 can be configured to identify wireless interfaces whose service coverage overlaps with that of the serving wireless interface. To this end, the central node 234 can analyze the location of the serving wireless interface, the location of other wireless interfaces, and the average size of service areas covered by each type of wireless interfaces. For example, the central node 234 can determine the physical distance between the serving AP 112 and a base station 108. If the physical distance between the serving AP 112 and the base station 108 is small enough such that the service area of the serving AP 112 overlaps, wholly or partially, with the service area of the base station 108, then the central node 234 can identify the base station 108 as a candidate wireless interface. The physical distance can be measured using the Euclidean distance metric, the Chebyshev distance metric, the Manhattan distance metric, or the Minkowski distance metric.

In other embodiments, to identify additional candidate wireless interfaces, the central node 234 can communicate with an identity database. In one embodiment, an identity database can be configured to maintain information on which wireless interfaces can serve the service area of a particular wireless interface. In another embodiment, an identity database can also be configured to maintain available wireless interfaces for a particular geographic location. The identity database can use this information to identify wireless interfaces with overlapping service area with the serving interface. Therefore, the central node 234 can request the identity database to identify which additional wireless interfaces can serve the service area of the serving interface. To this end, in step 5-1, the central node 234 sends a correlation request to the identity database. The correlation request inquires for available wireless interfaces that can serve the service area of the serving wireless interface. In step 5-2, the identity database can send a correlation response to the central node 234, indicating which additional wireless interfaces can serve the service area of the serving interface.

In certain embodiments, if the UE 134 is attached to the cellular network, the central node 234 may be aware of the physical location of the UE 134. For example, the central node 234 can receive the physical location of the UE 134 from the BSLF 232 as part of the network condition information. In this case, the central node 234 can identify candidate wireless interfaces for the UE 134 by analyzing the location of the UE 134, the location of wireless interfaces, and the average size of service areas for each type of wireless interfaces. If the physical distance between the UE 134 and a particular wireless interface is small such that the UE 134 is within the service area of the particular wireless interface, the central node 234 can include the particular wireless interface as one of the candidate wireless interfaces. In other embodiments, the central node 234 can identify the candidate wireless interfaces by querying the identity database. The central node 234 can query the identity database to return all available wireless interfaces at the UE's location and use the returned result as the candidate wireless interfaces.

Once the central node 234 identifies candidate wireless interfaces, the central node 234 prepares data load information to send to the UE 134. Because the WLC 228 already has the data load information associated with the APs, the central node 234 can only prepare the data load information associated with candidate base stations. In step 6, the central node 234 sends a cellular load message to the WLC 228. The cellular load message includes the data load information associated with candidate base stations 108.

In step 7, the WLC 228 can deliver the cellular load message to the UE 134 via one or more candidate APs 112. In certain embodiments, the WLC 228 formats the cellular load message as a Control and Provisioning of Wireless Access Points (CAPWAP) management frame and sends the cellular load message to one or more candidate APs 112. The APs 112 then broadcast the cellular load message to the UE 134 (or all the UEs in the AP's service area) as an enhanced Quality of Service Basic Service Set (e-QBSS) load element. In addition to the three parameters of a regular QBSS load element (e.g., station count, channel utilization, and available admission capacity), the e-QBSS load element can include the cellular network data load information associated with one or more candidate base stations 108. In certain embodiments, in step 7-1, when the WLC 228 receives the cellular load message from the central node 234, the WLC 228 can trigger the candidate APs 112 to broadcast their own data load information to the UE 134 (or all the UEs in the AP's service area). This way, the UE 134 can receive both the cellular network data load information and the WLAN data load information without disconnecting from the current network.

In step 8, the UE 134 can analyze the received data load information to decide to which wireless interface to connect. For example, the UE 134 can attach to a wireless interface handling the least amount of data traffic and/or with more available resources.

In certain embodiments, the UE 134 can also analyze additional network condition information to decide to which wireless interface to connect. The additional network condition information can include one or more of the following: the load condition associated with the candidate wireless interfaces, the wireless signal strength associated with the candidate wireless interfaces, and a configuration status on the UE 134 indicating whether the UE 134 favors the cellular network or the WLAN. The configuration status can be represented numerically. For example, the configuration status can be between 0 and 1, 0 indicating that the UE 134 should always attach to a base station, and 1 indicating that the UE 134 should always attach to an AP. The received data load information and the additional network condition information can be combined to generate a selection score using a selection algorithm. For example, the selection algorithm can have two inputs, the received data load information and the additional network condition information, where the received data load information would adaptively modify the selection algorithm. For instance, the selection algorithm can include a function with hysteresis and the received data load information can determine the threshold in the hysteresis function.

Figure 5:
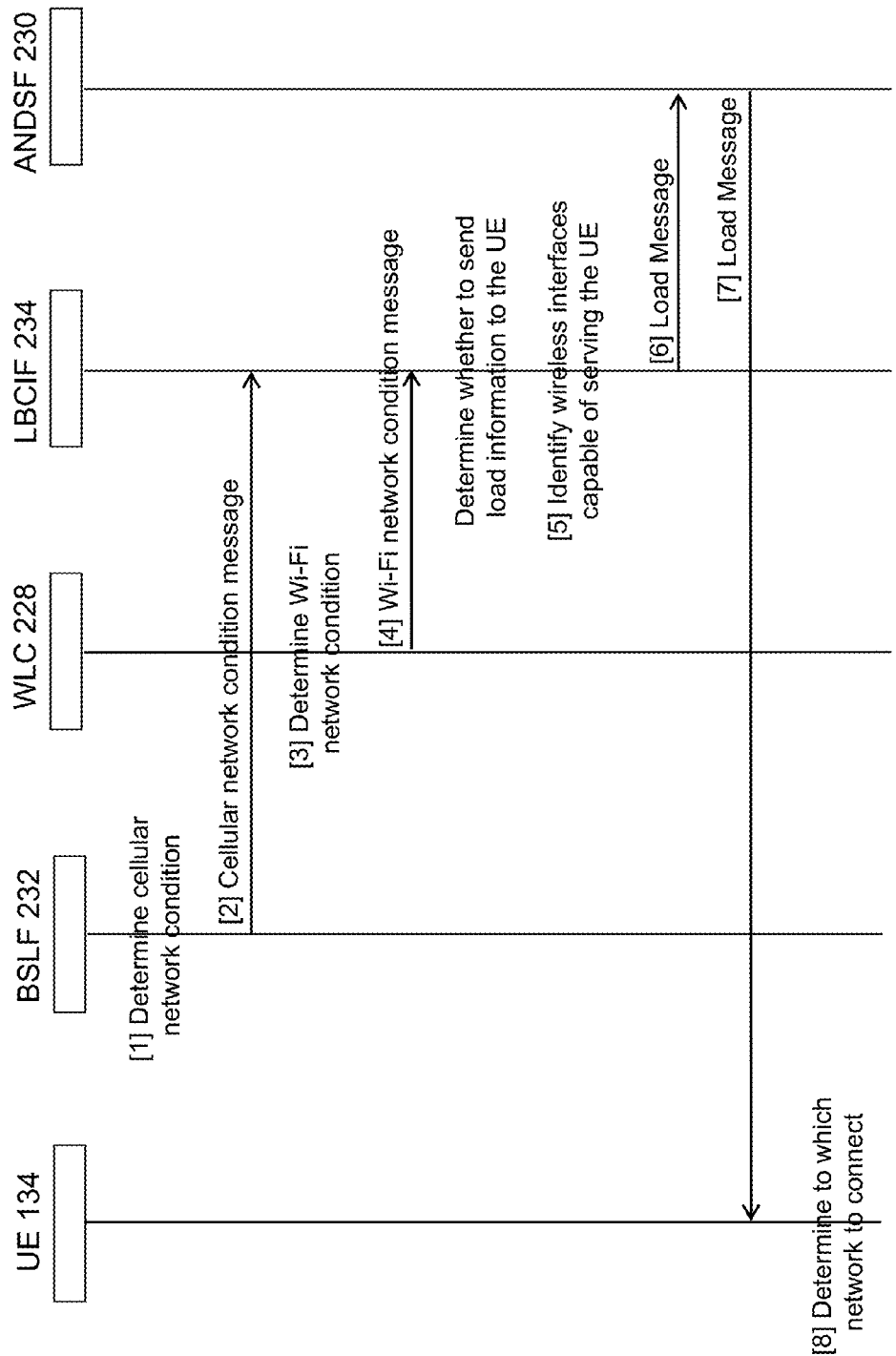
FIG. 5 shows a flow diagram for sending data load information of wireless interfaces via an access network discovery and selection function (ANDSF) in accordance with certain embodiments.

FIG. 5 illustrates an interworking of the cellular network and the WLAN in accordance with certain embodiments. FIG. 5 illustrates a scenario in which the central node 234 delivers the data load information over an ANDSF 230. Steps 1-5 of FIG. 5 are substantially similar to steps 1-5 of FIG. 4.

Suppose that the central node 234 has decided to send the data load information to a UE 134. Once the central node 234 identifies one or more candidate wireless interfaces that are each capable of serving the UE 134, the central node 234 prepares data load information to send to the UE 134. This data load information would include the data load information associated with the candidate wireless interfaces.

In step 6, the central node 234 can send a load message to the ANDSF 230 to which the UE 134 is registered. The load message can include the data load information of candidate wireless interfaces. In step 7, the ANDSF 230 can send the received load message to the UE 134. The ANDSF 230 can format the data load information of wireless interfaces as Inter-system routing policy or discovery information. In some embodiments, the ANDSF 230 can be enhanced to support real-time policy, in which case the ANDSF 230 can format the data load message as real-time policy. For example, the ANDSF 230 may have a long lived signaling session with the UE 134, for instance, using a TCP socket. In this case, the ANDSF 230 can associate the TCP Socket with the identity of the UE 134 and to use the long lived TCP session to communicate real-time policy to the UE 134.

In step 8, the UE 134 can analyze the received data load information to decide to which wireless interface to connect. This step is substantially similar to step 8 of FIG. 4. For example, the UE 134 can attach to the wireless interface with the least amount of data traffic and/or with more available resources.

Figure 6:
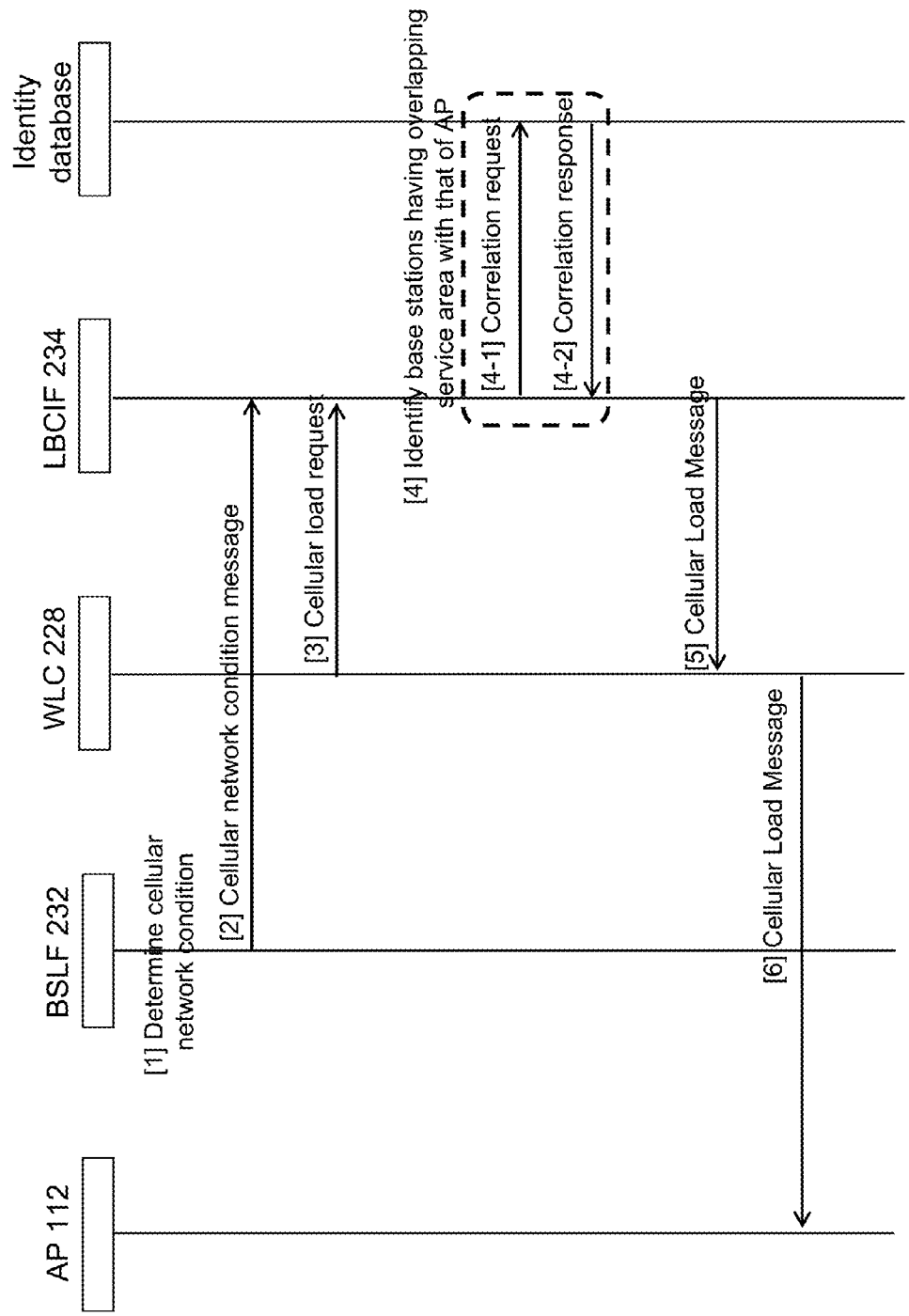
FIG. 6 shows a flow diagram in which the WLC triggers sending data load information of base stations to access points in accordance with certain embodiments.

FIG. 6 illustrates an interworking of the cellular network and the WLAN in accordance with certain embodiments. FIG. 6 illustrates a scenario in which the WLC 228 decides to send data load information to a UE 134. Steps 1-2 of FIG. 6 are substantially similar to steps 1-2 of FIG. 4.

In step 3, the WLC 228 decides to send the data load information of the cellular network to an AP 112 so that the AP 112 can broadcast the data load information of the cellular network to UEs. To this end, the WLC 228 sends a cellular load request to the central node 234. The cellular load request can include the physical location of the AP 112.

In step 4, the central node 234 can identify candidate base stations that have overlapping service area with that of the AP 112. To this end, the central node 234 can analyze the location of the AP 112, the location of base stations, and the size of service areas covered by the base stations and the AP 112. For example, the central node 234 can determine the physical distance between the AP 112 and a base station 108. If the physical distance between the AP 112 and the base station 108 is small enough such that the service area of the AP 112 overlaps, wholly or partially, with the service area of the base station 108, then the central node 234 can identify the base station 108 as a candidate base station. The physical distance can be measured using the Euclidean distance metric, the Chebyshev distance metric, the Manhattan distance metric, or the Minkowski distance metric.

In other embodiments, the central node 234 can request the identity database to identify which base station can serve the service area of the serving interface. To this end, in step 4-1, the central node 234 sends a correlation request to the identity database. The correlation request inquires for available base stations that can serve the service area of the AP 112. In step 4-2, the identity database can send a correlation response to the central node 234, indicating which base stations can serve the service area of the AP 112.

In step 5, the central node 234 can retrieve data load information associated with the candidate base stations. Subsequently, the central node 234 can send a cellular load message to the WLC 228. The cellular load message can include the data load information associated with the candidate base stations.

In step 6, the WLC 228 can relay the cellular load message to the AP 112. The AP 112 will subsequently broadcast the data load information associated with the candidate base stations to the UEs in the AP's service area.

Figure 7:
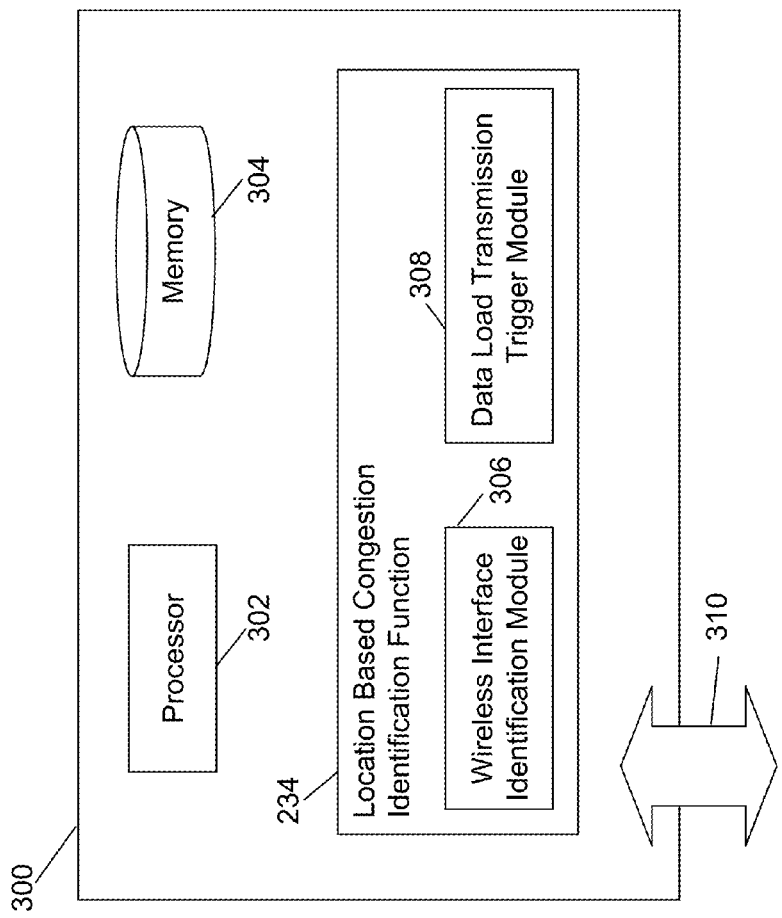
FIG. 7 shows a logical diagram of a mobility unit in accordance with certain embodiments.

FIG. 7 illustrates a logical view of a network device 300 in accordance with certain embodiments. The network device 300 can include an MME 120. The network device 300 can include a processor 302, a memory 304, a location-based congestion identification Function (LBCIF) 234 including a wireless interface identification module 306 and a data load transmission trigger module 308, and an interface 310.

The LBCIF 234 can include a wireless interface identification module 306. The wireless interface identification module 306 can identify wireless interfaces that are capable of serving a UE. To this end, the wireless interface identification module 306 can analyze the location of wireless interfaces. In certain embodiments, if the UE 134 is attached to the WLAN, the wireless interface identification module 306 can identify the serving AP 112 as one of the candidate APs for the UE 134. Also, if the UE 134 is attached to the cellular network, the wireless interface identification module 306 can identify the serving base station 108 as one of the candidate base stations for the UE 134.

In certain embodiments, to identify additional wireless interfaces that can also provide network service in the serving interface's service area, the wireless interface identification module 306 can analyze the location of the serving wireless interface, the location of other wireless interfaces, and the average size of service areas covered by each type of wireless interfaces. For example, the wireless interface identification module 306 can determine the physical distance between the serving AP 112 and a base station 108. The distance can be measured using the Euclidean distance metric, the Chebyshev distance metric, the Manhattan distance metric, or the Minkowski distance metric. If the physical distance between the serving AP 112 and the base station 108 is small enough such that the service area of the serving AP 112 overlaps, wholly or partially, with the service area of the base station 108, then the wireless interface identification module 306 can identify the base station 108 as a candidate wireless interface.

In other embodiments, to identify additional wireless interfaces that can also provide network service in the identified interface's service area, the wireless interface identification module 306 can communicate with an identity database. The wireless interface identification module 306 can request the identity database to identify which additional wireless interfaces can serve the service area of the identified interface.

The LBCIF 234 can also include a data load transmission trigger module 308. The Data load transmission trigger module 308 can trigger the LBCIF 234 to send the received data load information to UEs 134 periodically. To this end, the data load transmission trigger module 308 can monitor a timer and determine whether a predetermine amount of time has passed since the LBCIF 234 sent the data load information to the UEs 134.

In other embodiments, the data load transmission trigger module 308 can trigger the LBCIF 234 to send the received data load information to UEs 134 when certain events occur. For example, a data load transmission trigger module 308 can analyze the received network condition information to determine if any of the service areas in the parallel networks are congested or heavily utilized. If one of the service areas is congested or heavily utilized, the data load transmission trigger module 308 can identify the UEs currently served by the congested service area and the wireless interfaces that can also serve the congested service area. Subsequently, the data load transmission trigger module 308 can trigger the LBCIF 234 to send, to the identified UEs 134, the data load information associated with the identified wireless interfaces.

The wireless interface identification module 306 and the data load transmission trigger module 308 can be implemented in software using memory 304 such as a non-transitory computer readable medium, a programmable read only memory (PROM), or flash memory. The software can run on a processor 302 that executes instructions or computer code. The wireless interface identification module 306 and the data load transmission trigger module 308 may also be implemented in hardware using an application specific integrated circuit (ASIC), programmable logic array (PLA), or any other integrated circuit.

An interface 310 can provide an input and/or output mechanism to communicate with other network devices. The interface 310 can provide communication with network devices such as a MME 120, a WLC 228, and an ANDSF 230, as well as other core network nodes to send and receive control data. The interface 310 can be implemented in hardware to send and receive signals in a variety of mediums, such as optical, copper, and wireless, and in a number of different protocols some of which may be non-transient.

Figure 8:
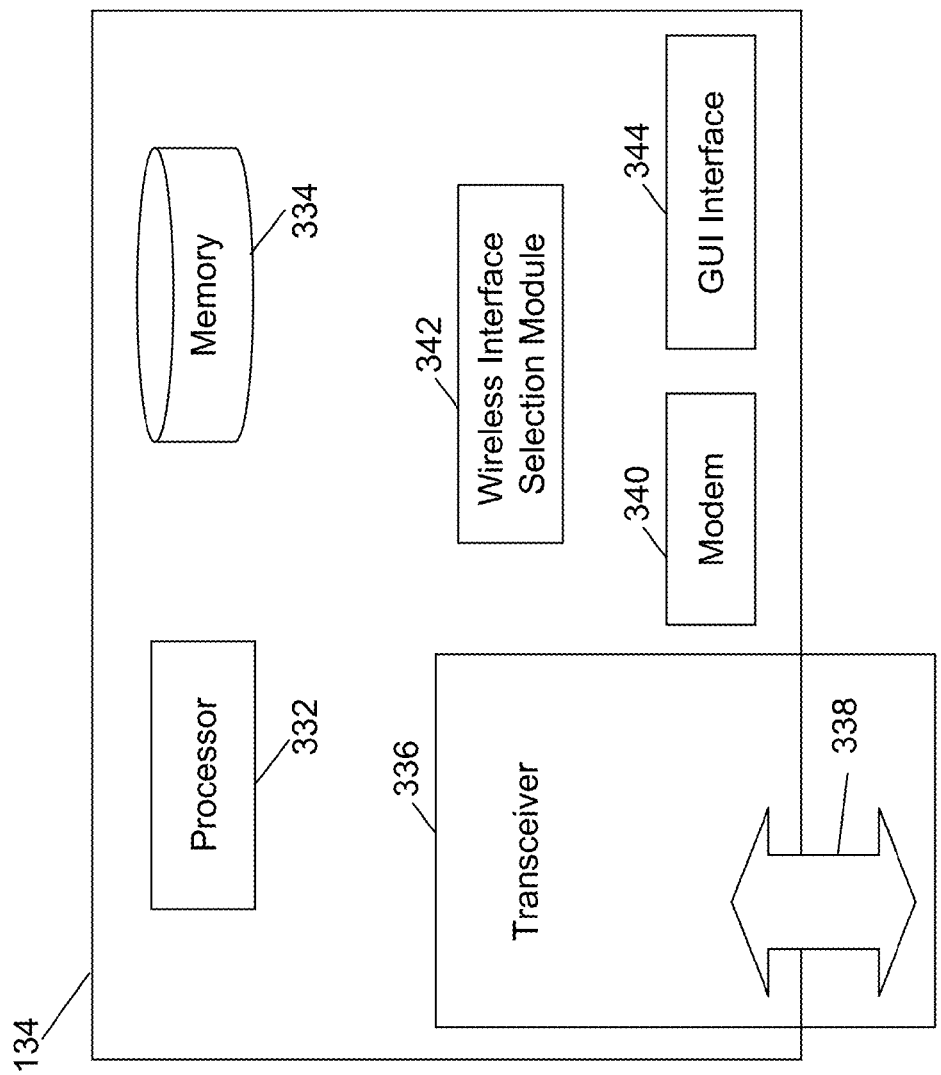
FIG. 8 shows a logical diagram of a user equipment in accordance with certain embodiments.

FIG. 8 illustrates a logical view of user equipment (UE) 134 in accordance with certain embodiments. The UE 134 can include a processor 332, a memory 334, a transceiver 336 including an interface 338, a modem 340, a wireless interface selection module 342, and a GUI interface 344.

The transceiver 336 includes a transmitter and a receiver. The transmitter and the receiver can be integrated into a single chip or can be embodied in separate chips. The transceiver 336 can also include an interface 338 that provides an input and/or output mechanism to communicate with other network devices. The interface 338 can measure the wireless signal strengths of wireless interfaces such as base stations and access points. The interface 338 can be implemented in hardware to send and receive signals in a variety of mediums, such as optical, copper, and wireless, and in a number of different protocols some of which may be non-transient.

The modem 340 is configured to implement modulation and framing of signals according to one or more communication standards. The communication standards include WLAN related standards such as 802.11 and its addenda, and the cellular standards defined under 3GPP.

The wireless interface selection module 342 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 342 can select the serving wireless interface by analyzing data load information associated with wireless interfaces. In certain embodiments, the wireless interface selection module 342 can be configured to attach to a wireless interface handling the least amount of data traffic and/or with more available resources. In certain embodiments, the wireless interface selection module 342 can also analyze additional information to decide to which wireless interface to connect. For example, the wireless interface selection module 342 can use one or more of the following: the load condition associated with the candidate wireless interfaces, the wireless signal strength associated with the candidate wireless interfaces, and a configuration status on the wireless interface selection module 342 indicating whether the UE 134 favors the cellular network or the WLAN.

The wireless interface selection module 342 can be implemented in software using memory 304 such as a non-transitory computer readable medium, a programmable read only memory (PROM), or flash memory. The software can run on a processor 302 that executes instructions or computer code. The wireless interface selection module 342 may also be implemented in hardware using an application specific integrated circuit (ASIC), programmable logic array (PLA), or any other integrated circuit.

The GUI interface 344 can provide communication with an input and/or output mechanism to communicate with UE users. UE users can use input/output devices to send/receive data to/from the UE 134 over the GUI interface 344. Input/output devices can include, but are not limited to, a keyboard, a screen, a touch screen, a monitor, and a mouse. The GUI interface 344 can operate under a number of different protocols, and the GUI interface 344 can be implemented in hardware to send and receive signals in a variety of mediums, such as optical, copper, and wireless.

User Equipment and Network Device

The UE 134 described above can communicate with a plurality of radio access networks using a plurality of access technologies and with wired communication networks. The UE 134 can be a smart phone offering advanced capabilities such as word processing, web browsing, gaming, e-book capabilities, an operating system, and a full keyboard. The UE 134 may run an operating system such as Symbian OS, iPhone OS, RIM's Blackberry, Windows Mobile, Linux, Palm WebOS, and Android. The screen may be a touch screen that can be used to input data to the UE 134 and the screen can be used instead of the full keyboard. The UE 134 may have the capability to run applications or communicate with applications that are provided by servers in the communication network. The UE 134 can receive updates and other information from these applications on the network.

The UE 134 also encompasses many other devices such as televisions (TVs), video projectors, set-top boxes or set-top units, digital video recorders (DVR), computers, netbooks, laptops, and any other audio/visual equipment that can communicate with a network. The UE 134 can also keep global positioning coordinates, profile information, or other location information in its stack or memory. The UE 134 can have a memory such as a computer readable medium, flash memory, a magnetic disk drive, an optical drive, a programmable read-only memory (PROM), and/or a read-only memory (ROM). The UE 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 134 can also provide a variety of user interfaces such as a keyboard, a touch screen, a trackball, a touch pad, and/or a mouse. The UE 134 may also include speakers and a display device in some embodiments.

The interworking between a cellular network and a WLAN can be implemented, at least in part, in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. The offload gateway can be implemented as any combination of the following including an xGSN, an xGW, an xGW-SGW, and an xGW-PGW.

Figure 9:
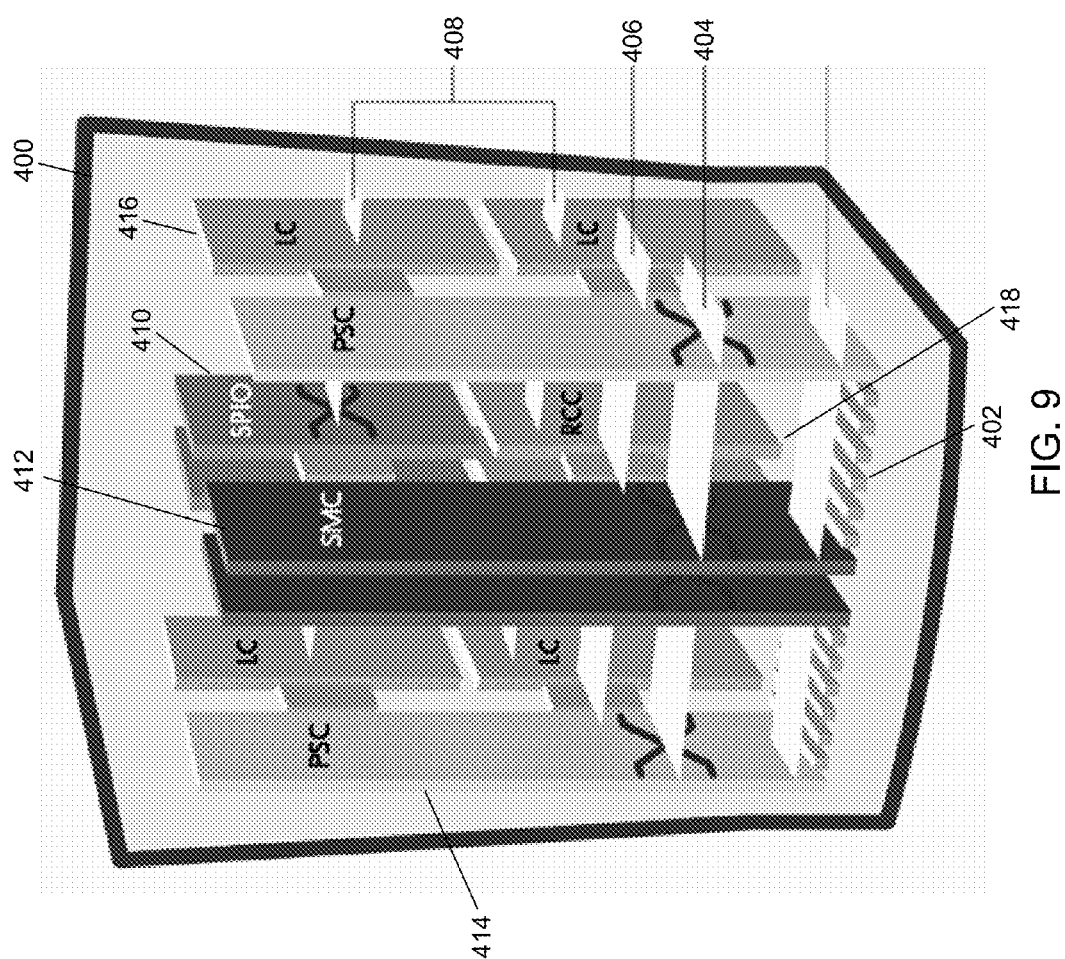
FIG. 9 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 9 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 10:
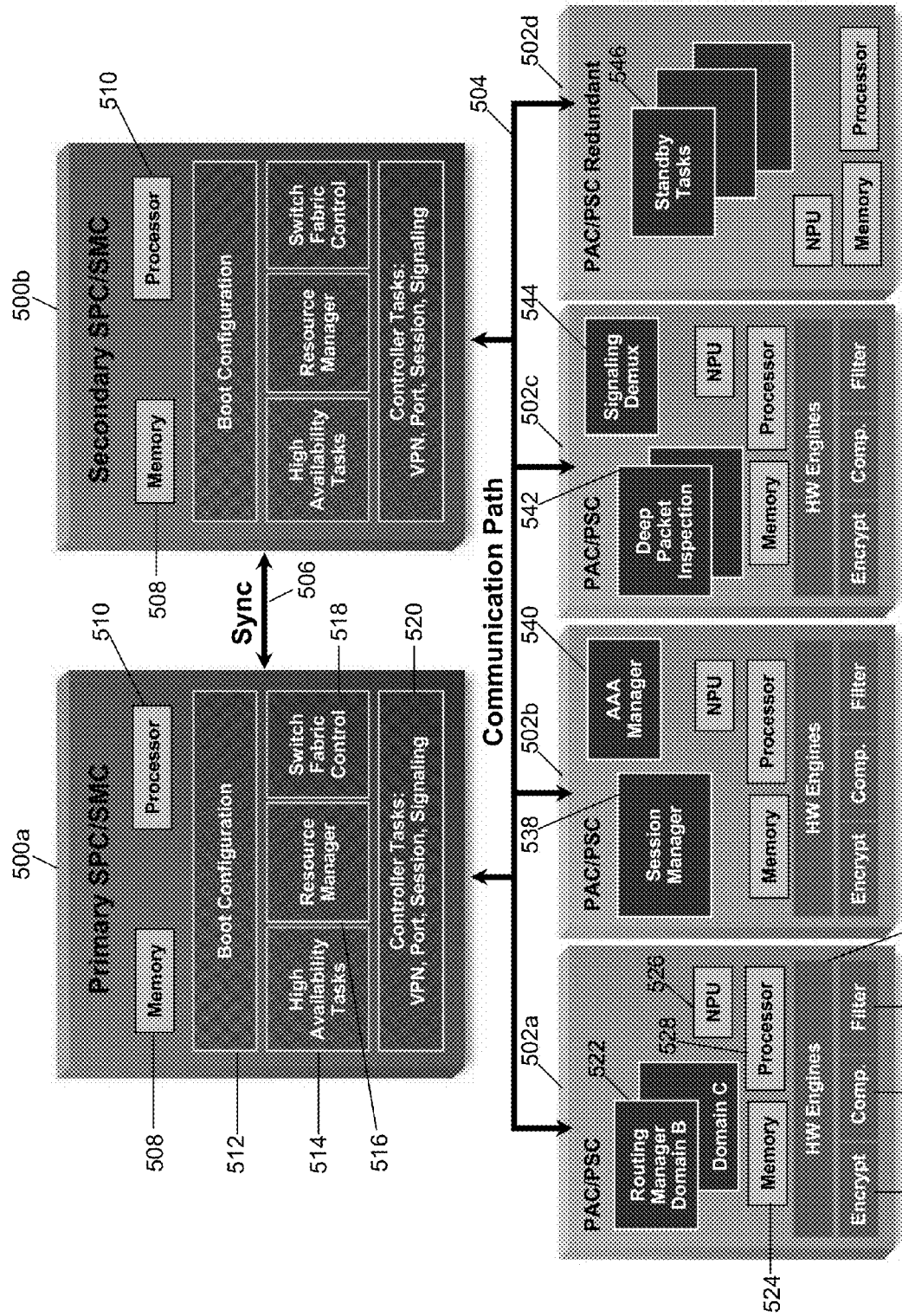
FIG. 10 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 10 illustrates a logical view of the software architecture of a network device in accordance with certain embodiments. As shown, the software and hardware can be distributed within the network device and across different circuit boards, processors, and memory. FIG. 10 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manages and controls the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for UE 134.

The PAC/PSC 502 is a high-speed processing card that is designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 is also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more UE 134. A session allows a UE 134 to communicate with the network for voice calls and data. The AAA manager 540 manages accounting, authentication, and authorization with an AAA server in the network. PAC/PSC 502 provides a DPI task 542 and a signaling demux 544. The DPI task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the LBCIF 234 can reside in a MME 120.

We claim:

1. A method comprising:
   receiving, at a network device in communication with a cellular network and a wireless local area network (WLAN), a cellular network condition message that includes first data load information associated with one or more base stations in the cellular network, wherein the one or more base stations are capable of providing network service to a user equipment, wherein the first data load information is indicative of an amount of data traffic handled by the one or more base stations in the cellular network;
   receiving, at the network device, a WLAN condition message that includes second data load information associated with one or more access points in the WLAN, wherein the one or more access points are capable of providing network service to the user equipment, wherein the second data load information is indicative of an amount of data traffic handled by the one or more access points in the WLAN; and when the user equipment is attached to one of the cellular network or the WLAN, causing, by the network device, the first data load information associated with the one or more base stations and the second data load information associated with the one or more access points to be sent to the user equipment over the one of the cellular network or the WLAN to which the user equipment is attached, thereby providing the user equipment with the first data load information and the second data load information when the user equipment is attached to only one of the cellular network or the WLAN, wherein the cellular network and the WLAN comprise different wireless technologies, and wherein the network device is a central node to be coupled to both the cellular network and to the WLAN and provide data load information associated with the one or more base stations to the WLAN and data load information associated with the one or more access points to the cellular network.

2. The method of claim 1, further comprising identifying the one or more base stations and the one or more access points that are capable of providing the network service to the user equipment, wherein the identifying the one or more base stations and the one or more access points includes:

if the user equipment is attached to the cellular network,
identifying a serving base station that is serving the user equipment;
identifying a physical location of candidate base stations and candidate access points; and
determining, based on the physical location of the candidate base stations and the candidate access points, which of the candidate base stations and the candidate access points has a service area that overlaps with that of the serving base station.

3. The method of claim 1, further comprising identifying the one or more base stations and the one or more access points that capable of providing the network service to the user equipment, wherein the identifying the one or more base stations and the one or more access points includes:

if the user equipment is attached to the WLAN,
identifying a serving access point that is serving the user equipment;
identifying a physical location of candidate base stations and candidate access points; and
determining, based on the physical location of the candidate base stations and the candidate access points, which of the candidate base stations and the candidate access points has a service area that overlaps with that of the serving access point.

4. The method of claim 1, further comprising identifying the one or more base stations and the one or more access points that are capable of providing the network service to the user equipment, wherein the identifying the one or more base stations and the one or more access points includes:

if the user equipment is attached to the cellular network,
identifying a physical location of the user equipment; and
determining which of candidate base stations and candidate access points has a service area that includes the physical location of the user equipment.

5. The method of claim 2, wherein the cellular network condition message includes physical location identifier information associated with the base station, wherein the WLAN condition message includes physical location identifier information associated with the access point, further wherein identifying the physical location of the candidate base stations and the candidate access points includes retrieving, from the cellular network condition message, the physical location identifier associated with the candidate base stations and retrieving, from the WLAN condition message, the physical location identifier associated with the candidate access points.

6. The method of claim 1, wherein causing the first data load information associated with the one or more base stations and the second data load information associated with the one or more access points to be sent to the user equipment includes sending, to a WLAN controller, the first data load information and the second data load information.

7. The method of claim 6, further comprising sending, to the user equipment, the first data load information associated with the one or more base stations as a Quality of Service Basic Service Set (QBSS) load element.

8. The method of claim 1, wherein causing the first data load information associated with the one or more base stations and the second data load information associated with the one or more access points to be sent to the user equipment includes sending the first data load information and the second data load information to an access network discovery and selection function (ANDSF).

9. The method of claim 8, further comprising sending, from the ANDSF to the user equipment, the first data load information and the second data load information.

10. The method of claim 1, wherein the first data load information and the second data load information includes an amount of additional data traffic that can be handled by each of the one or more base stations and the one or more access points.

11. The method of claim 1, wherein the data load information associated with the one or more access points in the WLAN that is provided to the cellular network comprises an indication of the total number of user equipments (UEs) currently associated with an access point.

12. The method of claim 1, further comprising, before causing the first data load information and the second data load information to be sent to the user equipment:

filtering out, by the network device, data load information of one or more base stations that are not candidate base stations for the user equipment to produce the first data load information; and
filtering out, by the network device, data load information of one or more access points that are not candidate access points for the user equipment to produce the second data load information.

13. A network device comprising:
one or more interfaces configured to provide communication with a mobility management entity (MME), a wireless local area network (WLAN) controller, and an access network discovery and selection function; and
a processor, in communication with the one or more interfaces, and configured to run a module stored in memory that is configured to:
identify first data load information associated with one or more base stations and second data load information associated with one or more access points that are capable of providing network service to a user equipment, wherein the first data load information is indicative of an amount of data traffic handled by the one or more base stations, and wherein the second data load information is indicative of an amount of data traffic handled by the one or more access points, and when the user equipment is attached to one of the cellular network or the WLAN, cause the first data load information and the second data load information to be sent to the user equipment over the one of the cellular network or the WLAN to which the user equipment is attached, thereby providing the user equipment with the first data load information and the second data load information when the user equipment is attached to only one of the cellular network or the WLAN, wherein the cellular network and the WLAN comprise different wireless technologies, and wherein the network device is a central node to be coupled to both the cellular network and to the WLAN and provide data load information associated with the one or more base stations to the WLAN and data load information associated with the one or more access points to the cellular network.

14. The network device of claim 13, wherein the module is further configured to receive, from the MME, the first data load information associated with the one or more base stations and to receive, from the WLAN controller, the second data load information associated with the one or more access points.

15. The network device of claim 13, wherein the module is further configured to identify a serving access point that is serving the user equipment, identify a physical location of the candidate base stations and the candidate access points, and to identify the one or more base stations and the one or more access points from the candidate base stations and the candidate access points by determining, based on the physical location of the candidate base stations and the candidate access points, which of the candidate base stations and the candidate access points has a service area that overlaps with that of the serving access point.

16. A non-transitory computer readable medium having executable instructions operable to cause a processor to:
receive, from a network device in a cellular network, a cellular network condition message, wherein the cellular network condition message includes first data load information associated with one or more base stations, in the cellular network, that are capable of providing network service to a user equipment, wherein the first data load information associated with the one or more base stations is indicative of an amount of data traffic handled by the one or more base stations;
receive, from a wireless local area network (WLAN) controller in a WLAN, a WLAN condition message, wherein the WLAN condition message includes second data load information associated with one or more access points, in the WLAN, that are capable of providing network service to the user equipment, wherein the second data load information associated with the one or more access points is indicative of an amount of data traffic handled by the one or more access points; and
when the user equipment is attached to one of the cellular network or the WLAN, cause the first data load information and the second data load information to be sent to the user equipment over the one of the cellular network or the WLAN to which the user equipment is attached, thereby providing the user equipment with the first data load information and the second data load information when the user equipment is attached to only one of the cellular network or the WLAN, wherein the cellular network and the WLAN comprise different wireless technologies, and wherein a central node comprising the processor is to be coupled to both the cellular network and to the WLAN and provide data load information associated with the one or more base stations to the WLAN and data load information associated with the one or more access points to the cellular network.

17. The non-transitory computer readable medium of claim 16, further comprising executable instructions operable to cause the processor to:
identify a serving base station that is serving the user equipment;
identify a physical location of candidate base stations and candidate access points; and
identify the one or more base stations and the one or more access points from the candidate base stations and the candidate access points by determining, based on the physical location of the candidate base stations and the candidate access points, which of the candidate base stations and the candidate access points has a service area that overlaps with that of the serving base station.

18. The non-transitory computer readable medium of claim 16, further comprising executable instructions operable to cause the processor to:
identify a serving access point that is serving the user equipment;
identify a physical location of candidate base stations and candidate access points; and
identify the one or more base stations and the one or more access points from the candidate base stations and the candidate access points by determining, based on the physical location of the candidate base stations and the candidate access points, which of the candidate base stations and the candidate access points has a service area that overlaps with that of the serving access point.

19. The non-transitory computer readable medium of claim 16, further comprising executable instructions operable to cause the processor to: identify a physical location of the user equipment; and
identify the one or more base stations and the one or more access points from the candidate base stations and the candidate access points by determining which of candidate base stations and candidate access points has a service area that includes the physical location of the user equipment.

20. The non-transitory computer readable medium of claim 16, further comprising executable instructions operable to cause the processor to send the first data load information and the second data load information to the WLAN controller.

21. The non-transitory computer readable medium of claim 16, further comprising executable instructions operable to cause the processor to send the first data load information and the second data load information to an access network discovery and selection function (ANDSF).

22. A user equipment comprising:
an interface configured to provide communication with one of a cellular network or a wireless local area network (WLAN) at a time; and
a processor, in communication with the interface, and configured to run a module that is configured to:
receive, from a network device through the one of the cellular network or the WLAN with which the user equipment is in communication, first data load information associated with one or more base stations in the cellular network and second data load information associated with one or more access points in the WLAN, wherein the one or more base stations and the one or more access points are capable of providing network service to the user equipment, wherein the first data load information is indicative of an amount of data traffic handled by the one or more base stations, and wherein the second data load information is indicative of an amount of data traffic handled by the one or more access points, measure wireless signal strengths associated with the one or more base stations and the one or more access points, and select, based on the received data load information and the measured wireless signal strengths, one of the one or more base stations and the one or more access points to receive network service, wherein the cellular network and the wireless local area network comprises different wireless technologies, and wherein the network device is a central node to be coupled to both the cellular network and to the WLAN and provide data load information associated with the one or more base stations to the WLAN and data load information associated with the one or more access points to the cellular network.

\* \* \* \* \*